(12) United States Patent
Bagley

(10) Patent No.: US 6,237,824 B1
(45) Date of Patent: May 29, 2001

(54) RACK SYSTEM FOR A VEHICLE

(76) Inventor: Steve M. Bagley, 30 Ossington Dr., Hamilton, Ontario (CA), L8W 3S4

( * ) Notice: Subject to any disclaimer, the term of this patent is extended or adjusted under 35 U.S.C. 154(b) by 0 days.

(21) Appl. No.: 09/666,919

(22) Filed: Sep. 21, 2000

(51) Int. Cl.⁷ .................................................. B60R 9/00
(52) U.S. Cl. ........................ 224/521; 224/402; 224/501; 224/532; 414/462
(58) Field of Search .................................. 224/402, 405, 224/488, 495, 501, 510, 511, 518, 519, 520, 521, 525, 529, 531, 532, 533, 534, 320, 567, 568, 552; 414/462; 296/26.09

(56) References Cited

U.S. PATENT DOCUMENTS

| D. 325,553 | 4/1992 | Weiner et al. . |
| 4,531,879 | 7/1985 | Horowitz . |
| 4,630,990 | 12/1986 | Whiting . |
| 5,458,389 | 10/1995 | Young . |
| 5,560,666 | 10/1996 | Vieira et al. . |
| 5,649,656 | 7/1997 | Davy . |
| 5,678,743 | * 10/1997 | Johnson et al. ........................ 224/485 |
| 5,788,135 | * 8/1998 | Janek .................................... 224/527 |
| 5,938,092 | * 8/1999 | Johnson ................................ 224/521 |
| 5,950,890 | * 9/1999 | Darby .................................... 224/402 |

* cited by examiner

Primary Examiner—Stephen K. Cronin

(57) ABSTRACT

A rack system for a vehicle for holding various items with a multi-purpose rack. The rack system for a vehicle includes a mounting securably attached to a vehicle. A support arm is removably coupled to the mounting and extends upwardly from the mounting. The support arm has a free end having a well extending therein. A bar, which is elongate, has a first end and a second end. The bar is generally hollow and the ends are open. A protruding member extends from the bar. The protruding member is removably extendable into the well. Each of a pair of extension arms is extendable into one of the ends of the bar. Each of the extension arms has a plurality of holes therein. At least two brackets are each removably attachable to one of the extension arms such that the brackets extend upwardly from the extension arms. Each of the brackets is adapted for receiving a pin extending through one of the holes on the extension arms.

8 Claims, 4 Drawing Sheets

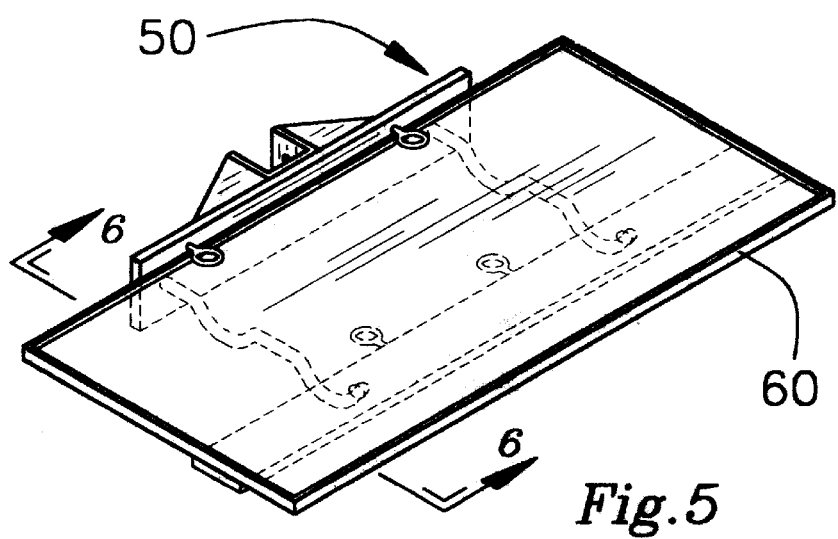
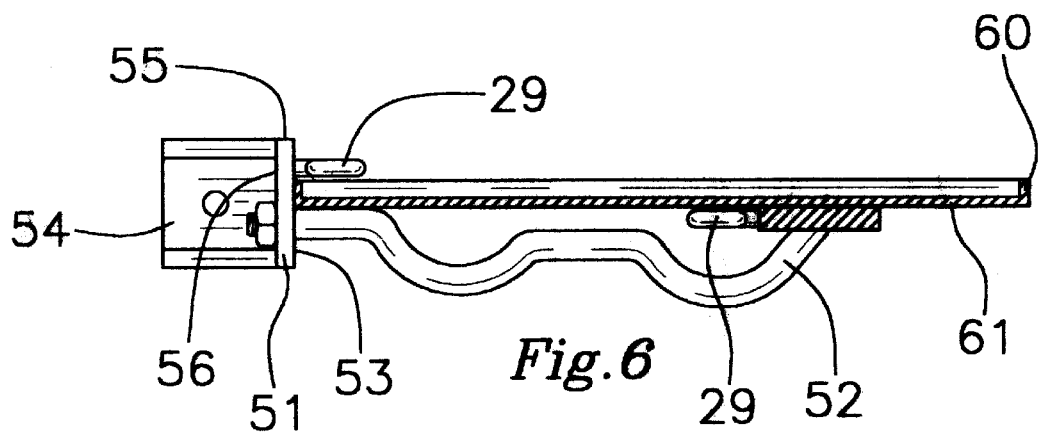
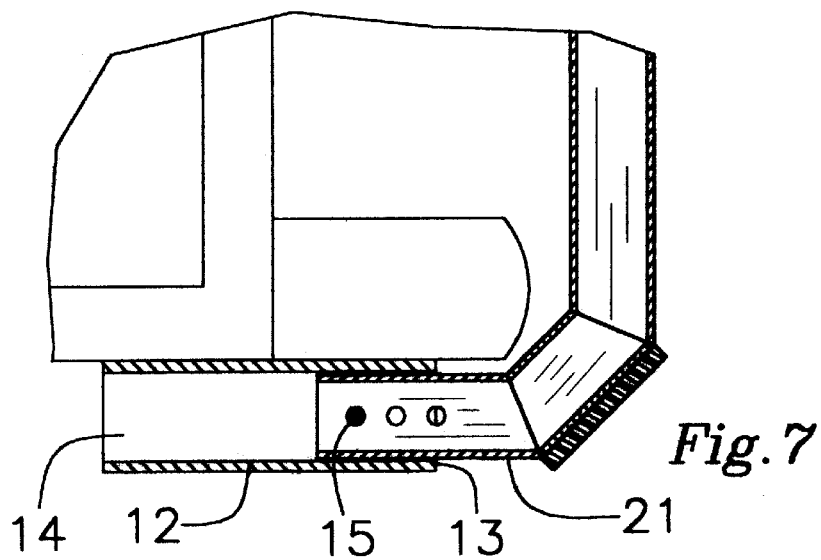

RACK SYSTEM FOR A VEHICLE

BACKGROUND OF THE INVENTION

1. Field of the Invention

The present invention relates to vehicle racks and more particularly pertains to a new rack system for a vehicle for holding various items with a multi-purpose rack.

2. Description of the Prior Art

The use of vehicle racks is known in the prior art. More specifically, vehicle racks heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,560,666; U.S. Pat. No. 5,458,389; U.S. Pat. No. 5,649,656; U.S. Pat. No. 4,531,879; U.S. Pat. No. 4,630,990; and U.S. Des. Pat. No. 325,553.

While these devices fulfill their respective, particular objectives and requirements, the aforementioned patents do not disclose a new rack system for a vehicle. The inventive device includes a mounting securably attached to a vehicle. A support arm is removably coupled to the mounting and extends upwardly from the mounting. The support arm has a free end having a well extending therein. A bar, which is elongate, has a first end and a second end. The bar is generally hollow and the ends are open. A protruding member extends from the bar. The protruding member is removably extendable into the well. Each of a pair of extension arms is extendable into one of the ends of the bar. Each of the extension arms has a plurality of holes therein. At least two brackets are each removably attachable to one of the extension arms such that the brackets extend upwardly from the extension arms. Each of the brackets is adapted for receiving a pin extending through one of the holes on the extension arms.

In these respects, the rack system for a vehicle according to the present invention substantially departs from the conventional concepts and designs of the prior art, and in so doing provides an apparatus primarily developed for the purpose of holding various items with a multi-purpose rack.

SUMMARY OF THE INVENTION

In view of the foregoing disadvantages inherent in the known types of vehicle racks now present in the prior art, the present invention provides a new rack system for a vehicle construction wherein the same can be utilized for holding various items with a multi-purpose rack.

The general purpose of the present invention, which will be described subsequently in greater detail, is to provide a new rack system for a vehicle apparatus and method which has many of the advantages of the vehicle racks mentioned heretofore and many novel features that result in a new rack system for a vehicle which is not anticipated, rendered obvious, suggested, or even implied by any of the prior art vehicle racks, either alone or in any combination thereof.

To attain this, the present invention generally comprises a mounting securably attached to a vehicle. A support arm is removably coupled to the mounting and extends upwardly from the mounting. The support arm has a free end having a well extending therein. A bar, which is elongate, has a first end and a second end. The bar is generally hollow and the ends are open. A protruding member extends from the bar. The protruding member is removably extendable into the well. Each of a pair of extension arms is extendable into one of the ends of the bar. Each of the extension arms has a plurality of holes therein. At least two brackets are each removably attachable to one of the extension arms such that the brackets extend upwardly from the extension arms. Each of the brackets is adapted for receiving a pin extending through one of the holes on the extension arms.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new rack system for a vehicle apparatus and method which has many of the advantages of the vehicle racks mentioned heretofore and many novel features that result in a new rack system for a vehicle which is not anticipated, rendered obvious, suggested, or even implied by any of the prior art vehicle racks, either alone or in any combination thereof.

It is another object of the present invention to provide a new rack system for a vehicle which may be easily and efficiently manufactured and marketed.

It is a further object of the present invention to provide a new rack system for a vehicle which is of a durable and reliable construction.

An even further object of the present invention is to provide a new rack system for a vehicle which is susceptible of a low cost of manufacture with regard to both materials and labor, and which accordingly is then susceptible of low prices of sale to the consuming public, thereby making such rack system for a vehicle economically available to the buying public.

Still yet another object of the present invention is to provide a new rack system for a vehicle which provides in the apparatuses and methods of the prior art some of the advantages thereof, while simultaneously overcoming some of the disadvantages normally associated therewith.

Still another object of the present invention is to provide a new rack system for a vehicle for holding various items with a multi-purpose rack.

Yet another object of the present invention is to provide a new rack system for a vehicle which includes a mounting securably attached to a vehicle. A support arm is removably coupled to the mounting and extends upwardly from the mounting. The support arm has a free end having a well extending therein. A bar, which is elongate, has a first end and a second end. The bar is generally hollow and the ends are open. A protruding member extends from the bar. The protruding member is removably extendable into the well. Each of a pair of extension arms is extendable into one of the ends of the bar. Each of the extension arms has a plurality of holes therein. At least two brackets are each removably attachable to one of the extension arms such that the brackets extend upwardly from the extension arms. Each of the brackets is adapted for receiving a pin extending through one of the holes on the extension arms.

Still yet another object of the present invention is to provide a new rack system for a vehicle that is adjustable for carrying canoes, bikes, or luggage type items.

Even still another object of the present invention is to provide a new rack system for a vehicle that is retrofittable to existing vehicles.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a schematic perspective view of the panel of the present invention.

FIG. 6 is a schematic cross-sectional view taken along line 6—6 of the present invention.

FIG. 7 is a schematic cross-sectional view taken along line 7—7 of the present invention.

DESCRIPTION OF THE PREFERRED EMBODIMENT

Figure 1:
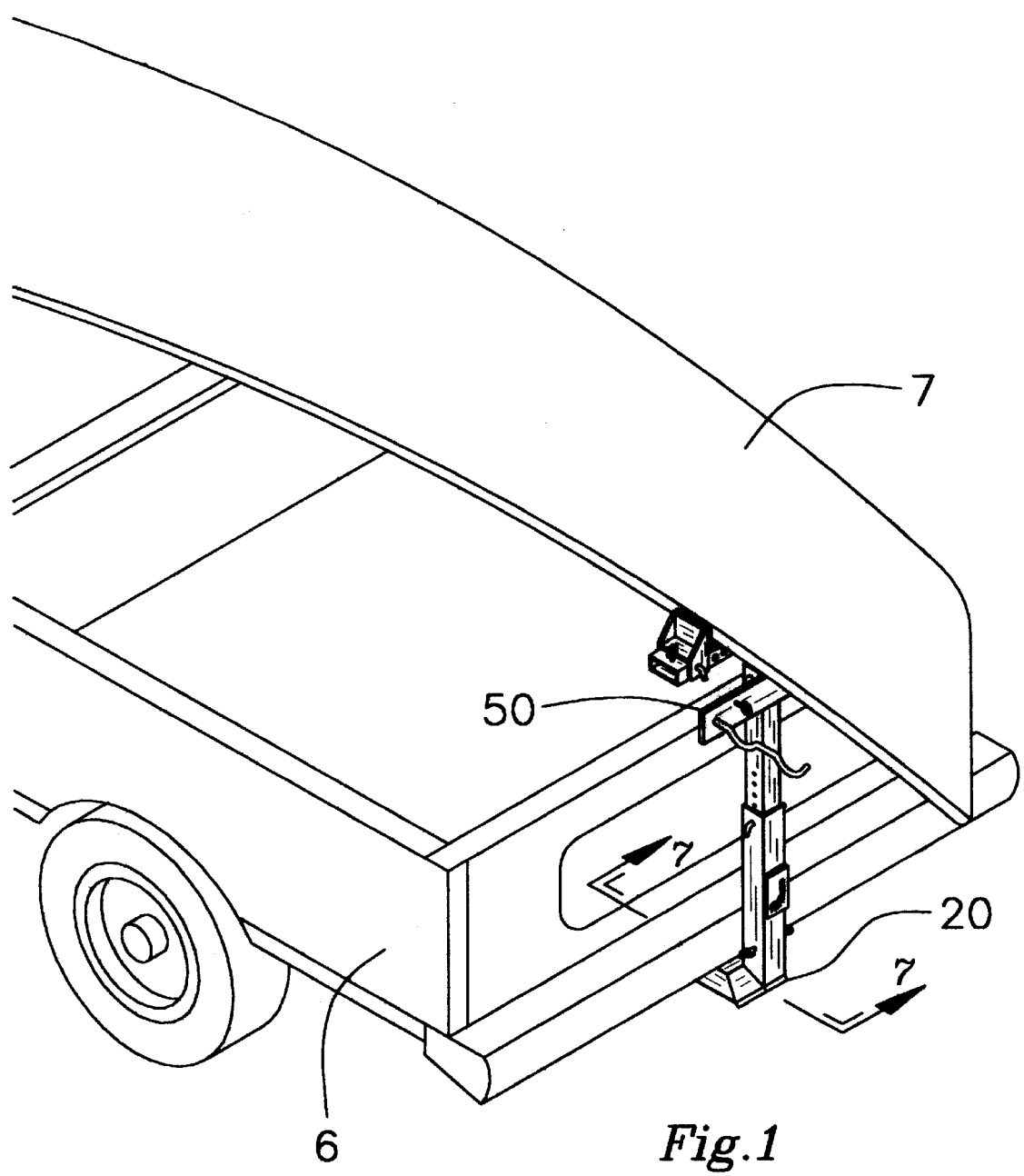
FIG. 1 is a schematic perspective in-use view of a new rack system for a vehicle according to the present invention.
Figure 2:
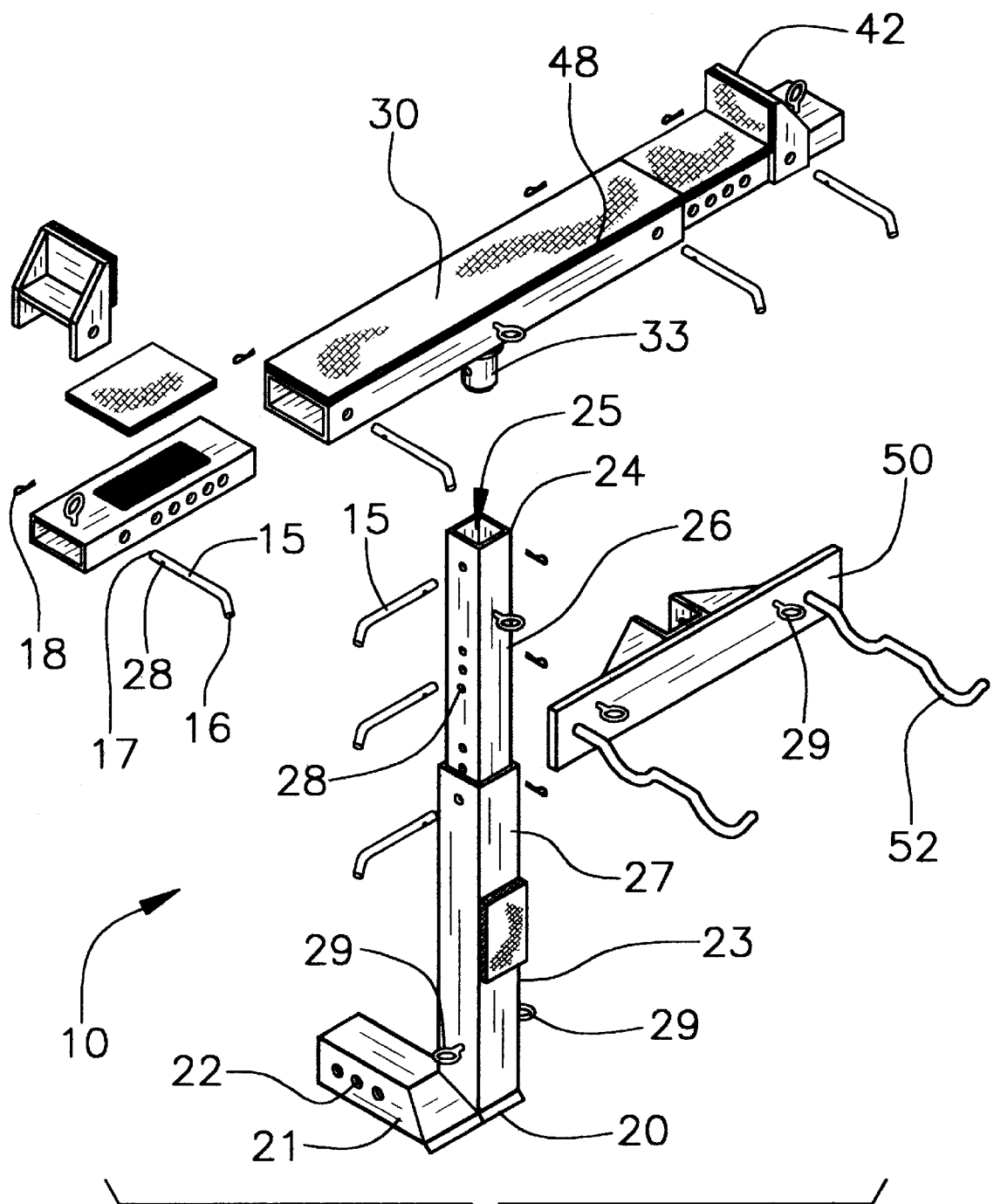
FIG. 2 is a schematic perspective view of the present invention.
Figure 3:
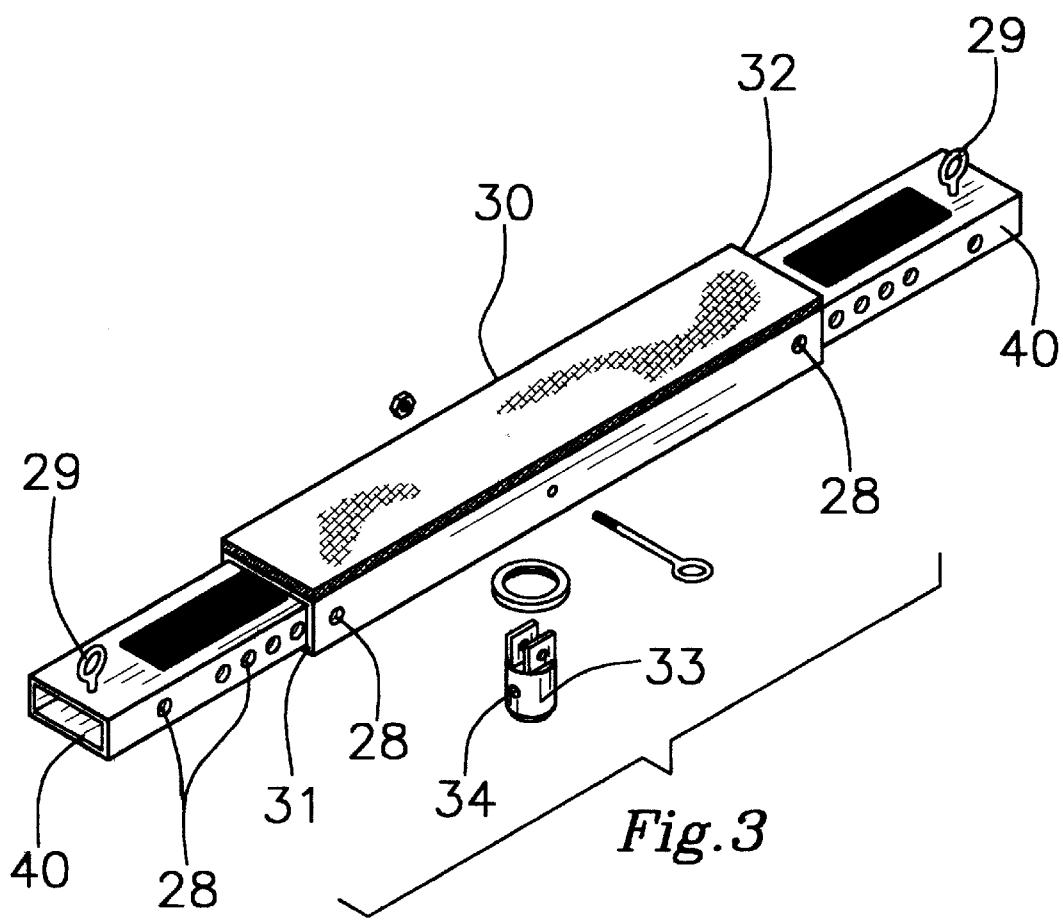
FIG. 3 is a schematic perspective view of the bar of the present invention.
Figure 4:
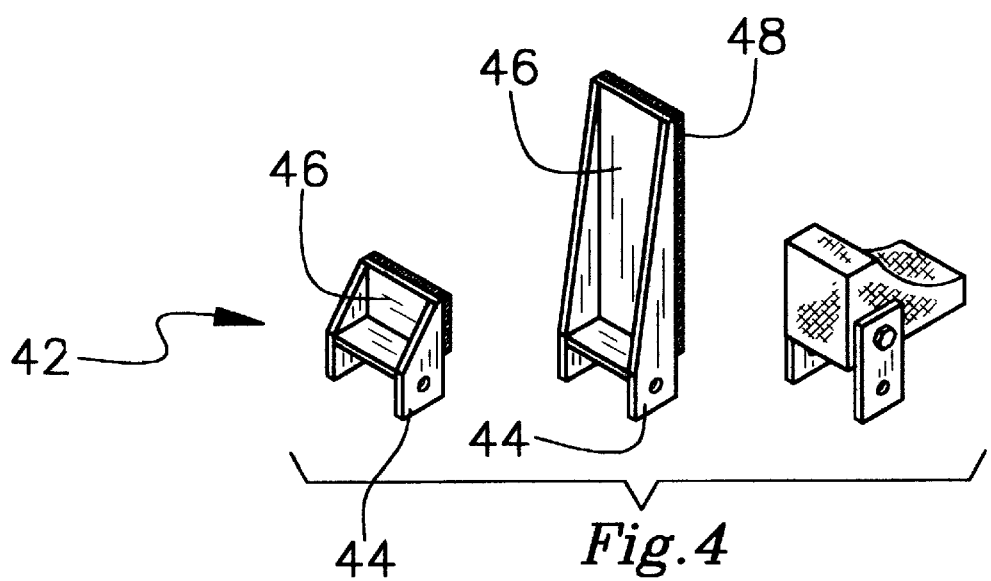
FIG. 4 is a schematic perspective view of the brackets of the present invention.

With reference now to the drawings, and in particular to FIGS. 1 through 7 thereof, a new rack system for a vehicle embodying the principles and concepts of the present invention and generally designated by the reference numeral 10 will be described.

As best illustrated in FIGS. 1 through 7, the rack system for a vehicle 10 includes a mounting 12. The mounting 12 is securably attached to a vehicle 6 and extends away from the back side of the vehicle 6. The mounting 12 has an end 13 having a bore therein 14. A pin 15 removably extends through the mounting 12. The pin 15 extends through the bore 14 and is orientated generally perpendicular to the bore 14.

A support arm 20 is removably coupled to the mounting 12. The support arm 20 has a foot portion 21. The foot portion 21 is extendable into the bore 14. The foot portion 21 has a plurality of apertures 22 extending therethrough for receiving the pin 15. The support arm 20 has a leg portion 23 that is integrally coupled to and extends upwardly from the foot portion 22. The leg portion 23 has a free end 24 having a well 25 extending downwardly therein. The leg portion 23 is orientated generally perpendicular to the foot portion 21. The leg portion 23 is telescoping such that a first portion 26 and a second portion 27 are defined. The first portion 26 is selectively extendable into the second portion 27. The second portion 27 is adjacent to the foot portion 21. The first portion 26 has a plurality of holes 28 therethrough orientated generally perpendicular to a longitudinal axis of the leg portion 23. The leg portion 23 has at least a plurality of annular members 29 securely attached thereto. The second portion 27 has a hole 28 extending therethrough and positioned near a free end of the second portion 27 such that a pin 15 may be extended through the hole 28 in the second portion 27 and through a hole 28 in the first portion 26. It should be noted that the pin 15 may be any fastening rod type device. The preferred embodiment employs pins 15 having a first bent end 16 and a second end 17 having a hole 28 therethrough for receiving a securing pin 18.

A bar 30 is elongate has a first end 31 and a second end 32. The bar 30 is generally hollow and the ends 31, 32 are open. A protruding member 33 extends from the bar 30. The protruding member 30 is removably extendable into the well 25. The protruding member 33 has an aperture 34 therethrough such that a pin 15 may be extended through a hole 28 in the leg portion 23 and to removably couple to the protruding member 33 to the leg portion 23. The protruding member 33 is generally positioned between the first and second ends of the bar 30 and is preferably removable from the bar. The bar 30 has a pair of holes 28 extending therethrough. Each of the pair of holes 28 is generally orthogonal to a longitudinal axis of the bar 30. Each of the holes 28 is positioned generally adjacent to one of the ends 31, 32 of the bar 30.

Each of a pair of extension arms 40 is extendable into one of the ends 31, 32 of the bar 30. Each of the extension arms 40 has a plurality of holes 28 therein. The holes 28 in the extension arms 40 are generally orthogonal to a longitudinal axis of the arms 40. Each of a pair of pins 15 may be extended through one of the holes 28 in the bar 30 and through one of the holes 28 in one of the arms 40 to removably couple the arms 40 to the bar 30. Each of the extension arms 40 preferably has annular members 29 coupled thereto.

Each of a plurality of brackets 42 is removably attachable to one of the extension arms 40 such that the brackets 42 extend upwardly from the extension arms 40. Each of the brackets 42 has a bottom portion 44 that is adapted for receiving a pin 15 extending through one of the holes 28 on the extension arms 40. The brackets have top portions 46 which are walls for holding items between them. Ideally, the walls 46 on the brackets 42 and the top of the bar 30 have padding 48 thereon.

A rack member 50 is comprised of a wall 51 and a pair of rods 52. Each of the rods 52 is coupled to and extends away from a front side 53 of the wall 51. A coupling means 54 couples the wall 51 to the leg portion 23 and is securely attached to a back side 56 of the wall 51. The coupling means 54 is adapted to be movably positioned along a length of the first portion 26 of the foot portion 23. The coupling means 54 is adapted for removably receiving a pin 15 extending through a hole 28 extending through the first portion 26. Each of the rods 52 has undulations therein as are conventionally found on bike racks for supporting bikes in a vertical position. A pair of annular members 29 are coupled to and extend away from the front side 53. Each of the annular members 29 on the rack member are generally positioned between one of the rods 52 and a top edge 55 of the wall 51.

A panel 60, which is substantially rigid, is positionable on the rods 52 and between the rods 52 and the annular members 29 on the rack member 50. The panel 60 has a bottom side 61 having a pair of annular members 29 securely attached thereto.

In use, the bar 30 may be placed on the support arm 20. The extension arms 40 may be extended to fit the item to be carried, such as a canoe 7 as shown in FIG. 1. The brackets 40 are positioned on either side of the item and secured with a pin 15. The support arm 20 may be lengthened to hold the item higher or lower with respect to the vehicle 6. The rack member 50 may be positioned on the support arm 20 to carry bikes, or to hold items as luggage. The annular members 29 found on the support arm 20, extension arms 40, rack member 50 and panel 60 are used for tying cords or other elongate flexible members to. Two devices 10 may be used in tandem with one on the front of the vehicle 6 and one on the back of the vehicle 6.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A rack system for removably mounting to a vehicle, said system comprising:

a mounting, said mounting being securably attached to said vehicle;

a support arm, said support arm being removably coupled to said mounting, said support arm extending upwardly from said mounting, said support arm having a free end having a well extending therein;

a bar, said bar being elongate, said bar being elongate and having a first end and a second end, said bar being generally hollow and said ends being open, a protruding member extending from said bar, said protruding member being removably extendable into said well;

a pair of extension arms, each of said extension arms being extendable into one of said ends of said bar, each of said extension arms having a plurality of holes therein; and at least two brackets, each of said brackets being removably attachable to one of said extension arms such that said brackets extend upwardly from said extension arms, each of said brackets being adapted for receiving a pin extending through one of said holes on said extension arms.

2. The rack system as in claim 1, comprising:

said bar having a pair of holes extending therethrough, each of said pair of holes being generally orthogonal to a longitudinal axis of said bar, each of said holes being positioned generally adjacent to one of said ends of said bar; and wherein each of a pair of pins may be extended through one of said holes in said bar and through one of said holes in one of said arms to removably couple said arms to said bar.

3. The rack system as in claim 1, further comprising:

a rack member, said rack member comprising a wall and a pair of rods, each of said rods being coupled to and extending away from a front side of said wall, a coupling means for coupling said wall to said leg portion being securely attached to a back side of said wall, said coupling means being adapted to movably positioned along a length of said first portion of said foot portion.

4. The rack system as in claim 1, comprising:

said mounting having an end having bore therein, a pin removably extending through said mounting, said pin extending through said bore and being orientated generally perpendicular to said bore; and said support arm having a foot portion, said foot portion being extendable into said bore, said foot portion having a plurality of apertures extending therethrough for receiving said pin extending through said mounting.

5. The rack system as in claim 4, wherein said support arm comprises:

said support arm having a leg portion being integrally coupled to and extending upwardly from said foot portion, said leg portion having said free end, said leg portion being orientated generally perpendicular to said foot portion, said leg portion being telescoping such that a first portion and a second portion are defined, said first portion being selectively extendable into said second portion.

6. The rack system as in claim 5, further comprising:

a rack member, said rack member comprising a wall and a pair of rods, each of said rods being coupled to and extending away from a front side of said wall, a coupling means for coupling said wall to said leg portion being securely attached to a back side of said wall, said coupling means being adapted to movably positioned along a length of said first portion of said foot portion, said coupling means being adapted for removably receiving a pin extending through a hole extending through said first portion.

7. The rack system as in claim 6, further comprising:

a panel, said panel being substantially rigid, said panel being positionable on said rods.

8. A rack system for removably mounting to a vehicle, said system comprising:

a mounting, said mounting being securably attached to said vehicle, said mounting having an end having a bore therein, a pin removably extending through said mounting, said pin extending through said bore and being orientated generally perpendicular to said bore;

a support arm, said support arm being removably coupled to said mounting, said support arm having a foot portion, said foot portion being extendable into said bore, said foot portion having a plurality of apertures extending therethrough for receiving said pin, said support arm having a leg portion being integrally coupled to and extending upwardly from said foot portion, said leg portion having a free end, said leg portion being orientated generally perpendicular to said foot portion, said leg portion being telescoping such that a first portion and a second portion are defined, said first portion being selectively extendable into said second portion, said second portion being adjacent to said foot portion, said first portion having a plurality of holes therethrough orientated generally perpendicular to a longitudinal axis of said leg portion, said leg portion having at least a plurality of annular members securely attached thereto, said free end of said foot portion having a well extending downwardly therein;

a bar, said bar being elongate, said bar being elongate and having a first end and a second end, said bar being generally hollow and said ends being open, a protruding member extending from said bar, said protruding member being removably extendable into said well, said protruding member having an aperture therethrough such that a pin may be extended through a hole in said leg portion and through and removably coupled to said leg portion, said protruding member being generally positioned between said first and second ends of said bar, said bar having a pair of holes extending therethrough, each of said pair of holes being generally orthogonal to a longitudinal axis of said bar, each of said holes being positioned generally adjacent to one of said ends of said bar;

a pair of extension arms, each of said extension arms being extendable into one of said ends of said bar, each of said extension arms having a plurality of holes therein, said holes in said extension arms being generally orthogonal to a longitudinal axis of said arms, wherein each of a pair of pins may be extended through one of said holes in said bar and through one of said holes in one of said arms to removably couple said arms to said bar;

a plurality of brackets, each of said brackets being removably attachable to one of said extension arms such that said brackets extend upwardly from said extension arms, each of said brackets being adapted for receiving a pin extending through one of said holes on said extension arms;

a rack member, said rack member comprising a wall and a pair of rods, each of said rods being coupled to and extending away from a front side of said wall, a coupling means for coupling said wall to said leg portion being securely attached to a back side of said wall, said coupling means being adapted to movably positioned along a length of said first portion of said foot portion, said coupling means being adapted for removably receiving a pin extending through a hole extending through said first portion, each of said rods having undulations therein, a pair of annular members being coupled to and extending away from said front side, each of said annular members on said rack member being generally positioned between one of said rods and a top edge of said wall; and a panel, said panel being substantially rigid, said panel being positionable on said rods and between said rods and said annular members on said rack member, said panel having a bottom side having a pair of annular members securely attached thereto.

* * * * *